United States Patent Office 3,200,168
Patented Aug. 10, 1965

3,200,168
OLEFIN HYDROGENATION WITH BORANE
ALUMINUM ALCOHOLATE CATALYST
Janos Kollonitsch, Westfield, N.J., assignor to Merck & Co., Inc., Rahway, N.J., a corporation of New Jersey
No Drawing. Filed Apr. 3, 1963, Ser. No. 270,167
9 Claims. (Cl. 260—683.9)

This invention relates to the homogeneous catalytic hydrogenation of alkenes, preferably having up to 30 carbon atoms, to alkanes by reaction with hydrogen gas in the presence of borane aluminum alcoholates as a catalyst having the formula:

$$AlH_3(BH_3)_3 \cdot 3Al(OR)_3 \qquad (I)$$

wherein R is a hydrocarbon radical having up to 30 carbon atoms and is selected from among alkyl, aralkyl and cycloalkyl groups.

These compounds are described in U.S. Patents 2,903,470, 2,903,471, and 2,903,472.

The reaction of the present invention is carried out under hydrogen pressure, preferably in the range between about 1000–5000 p.s.i., and at elevated temperatures, preferably between about 150° C. and 250° C. When the catalyst is present in amounts of about 1 to 5 mol percent, a rapid conversion rate is attained.

The nature of R in I is not critical; R-isopropyl (BAP) and R-isobutyl (BAB) are preferable since they are liquid at room temperature thereby making their handling convenient.

Recovery of the catalyst is nearly quantitative and is accomplished easily by fractional distillation since its boiling point is very high in relation to most of the alkanes produced. For example, BAP and BAB both have boiling points of about 120° C. at 0.5 mm. pressure.

The main advantage of the novel method of the present invention is the fact that the catalysts employed herein are not sensitive to catalyst poisoning. In sharp contrast, the heterogeneous catalysts such as platinum, palladium and nickel are easily poisoned by sulfur and the like.

Preferably all the operations herein are performed under a protective atmosphere of an inert gas, such as nitrogen, argon and helium.

EXAMPLE I

Reduction of cyclohexene to cyclohexane

A mixture of 82 g. of cyclohexene and 6 g. of BAP was hydrogenated at 220° C. at a starting hydrogen pressure of 2300 p.s.i. After 8 hours of shaking, the hydrogen uptake ceased, indicating an end of the hydrogenation. Upon fractional distillation of the clear, colorless solution there is obtained 83 g. of cyclohexane (99% of theory); the purity is checked by I.R. and gas chromatography. The residue of the distillation (5.9 g.) is pure BAP as determined by analysis for B, Al and active hydrogen.

EXAMPLE II

Reduction of 2,4,4-trimethlypentene-

A mixture of 114 g. of octene-(1) and 16 g. of BAB is hydrogenated at 200° C. Starting hydrogen pressure 2000 p.s.i. After 5 hours of shaking, the pressure drop ceased. By fractional distillation 112 g. (97% of theory) of octane is obtained; the residue is a clear thick oil (15.2 g.) which is shown as above to be pure BAB.

EXAMPLE III

Reduction of 2,4,4-trimethylpentene-
(2) into 2,4,4-trimethylpentane

A mixture of 228 g. 2,4,4-trimethylpentene-(2) and 38 g. of BAP was hydrogenated at 250° C. with a starting hydrogen pressure of 2500 p.s.i. The initial pressure drop ceased after 11 hours of shaking. 2,4,4-trimethylpentane was obtained upon fractional distillation in a 96% yield of theory. The recovery of catalyst is 97% complete.

EXAMPLE IV

Following the procedure described above and using the following starting materials: butene-1, butene-2, pentene-1, pentene-2, dodecene-6, methyl-cyclohexene-1, 4-methylpentene-2, 2-methylpentene-1, butadiene, cyclooctadiene-1,5, and 2-methylbutadiene, the corresponding compounds n-butane, n-pentane, n-dodecane, methylcyclohexane, 4-methylpentane, 2-methylpentane, n-butane, cyclooctane, and 2-methylbutane are obtained.

What is claimed is:
1. A method for preparing alkanes by catalytic hydrogenation of alkenes which comprises treating alkenes having up to 30 carbon atoms with hydrogen in the presence of a borane aluminum alcoholate catalyst having the formula

$$AlH_3(BH_3)_3 \cdot 3Al(OR)_3$$

wherein each R is selected from the group consisting of alkyl, aralkyl and cycloalkyl radicals having up to 30 carbon atoms.

2. A method for preparing alkanes by catalytic hydrogenation of alkenes which comprises treating alkenes having up to 30 carbon atoms with hydrogen at a pressure of between 1000 and 5000 pounds per square inch in the presence of a borane aluminum alcoholate catalyst having the formula $$AlH_3(BH_3)_3 \cdot 3Al(OR)_3$$

wherein each R is selected from the group consisting of alkyl, aralkyl and cycloalkyl radicals having up to 30 carbon atoms.

3. The method in accordance with claim 1 wherein the reaction is carried out at a temperature of between about 150 and 250°.

4. The method in accordance with claim 1 wherein the catalyst is present in a concentration of about 1–5 mol percent.

5. The method in accordance with claim 1 wherein the borane aluminum alcoholate is borane aluminum isopropylate.

6. The method in accordance with claim 1 wherein the borane aluminum alcoholate is borane aluminum isobutylate.

7. A method of converting cyclohexene to cyclohexane which comprises hydrogenating cyclohexene with borane aluminum isopropylate at 220° C. and a hydrogen pressure of 2300 p.s.i.

8. A method of converting octene-(1) to octane which comprises hydrogenating octene-(1) with borane aluminum isobutylate at 200° C. under a hydrogen pressure of 2000 p.s.i.

9. A method of converting 2,4,4-trimethylpentene- (2) to 2,4,4-trimethylpentane which comprises hydrogenating 2,4,4-trimethylpentene-(2) with borane aluminum isopropylate at a temperature of 250° C. and at hydrogen pressure of 2500°.

References Cited by the Examiner

UNITED STATES PATENTS

| | | | |
|---|---|---|---|
| 2,903,470 | 9/59 | Kollonitsch | 260—448 |
| 2,903,471 | 9/59 | Kollonitsch | 260—448 |
| 2,903,472 | 9/59 | Kollonitsch | 260—448 |

ALPHONSO D. SULLIVAN, Primary Examiner.